March 10, 1953

A. W. GRISWOLD 2,631,001

FLOW DIVERSION VALVE

Filed Aug. 20, 1949

INVENTOR.
AUGUSTUS W. GRISWOLD
BY
D. Clyde Jones,
ATTORNEY

Patented Mar. 10, 1953

2,631,001

UNITED STATES PATENT OFFICE 2,631,001

FLOW DIVERSION VALVE

Augustus W. Griswold, Rochester, N. Y., assignor to Taylor Instrument Companies, Rochester, N. Y., a corporation of New York Application August 20, 1949, Serial No. 111,410

3 Claims. (Cl. 251—76)

This invention relates to a flow diversion valve.

In the pasteurization of milk and the like, it is required that all parts of the pasteurizing system be readily assembled and disassembled. This is essential since all parts of the pasteurizing system, which come in contact with the milk, must be thoroughly cleansed each day in order to keep the equipment sanitary.

Various types of flow diversion valves have been proposed for use in pasteurizing systems, but these prior valves have been relatively expensive because of the complexity of the construction of the valve body. One conventional type of such valve, is disclosed in the patent to Olson 2,472,984, granted June 14, 1949.

The present invention has for its purpose the production of a flow diversion valve which is simple in construction, yet reliable in operation, and which can be readily disassembled for cleaning whereby a relatively inexpensive and efficient valve of this type is made available.

The various features and advantages of the invention will appear from the detailed description and claims when taken with the drawings in which:

Figures 1, 2, 3:
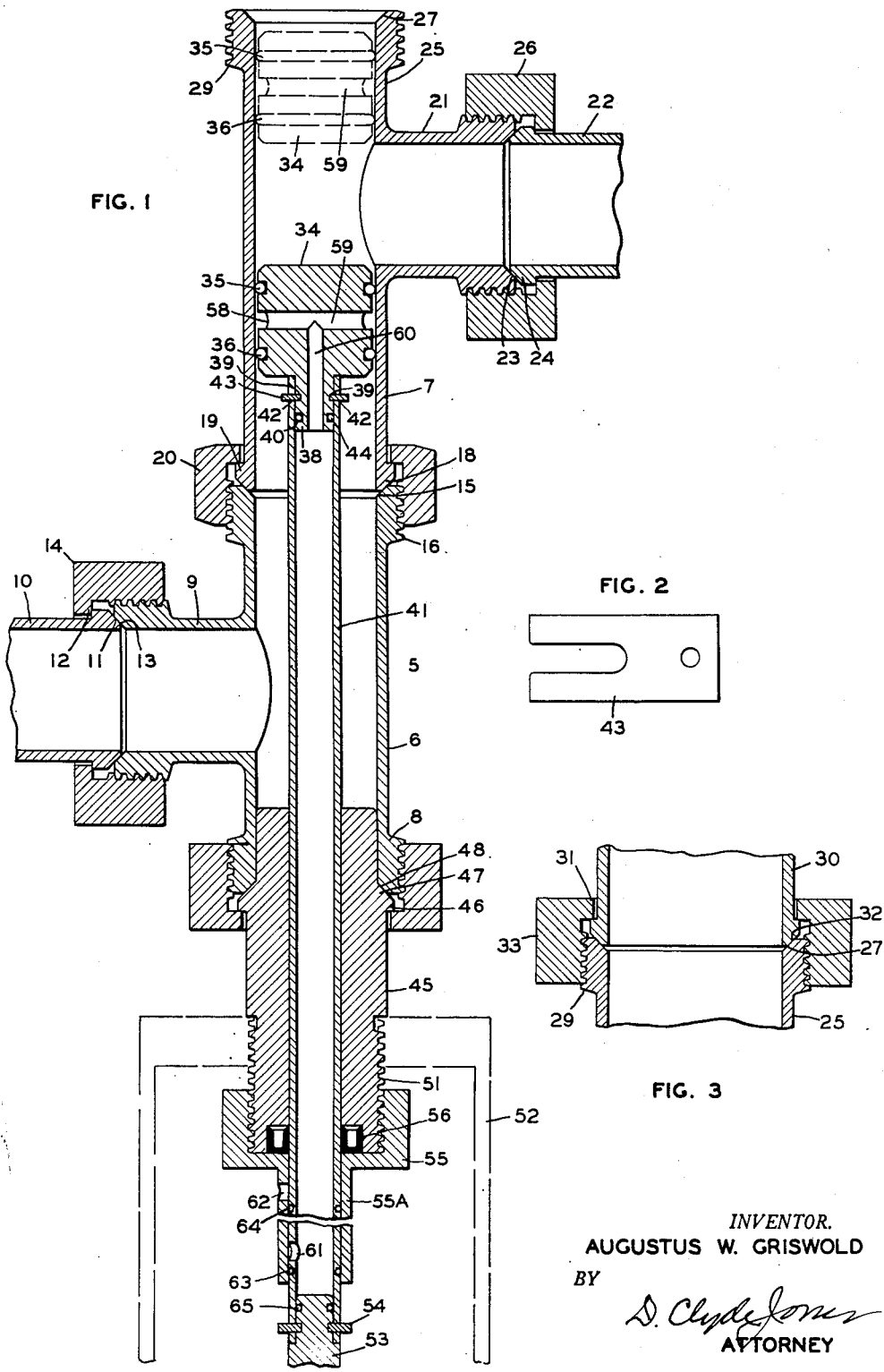
Fig. 1 is a vertical section taken through the flow diversion valve of the present invention.
Fig. 2 is a plan view of a key for coupling the valve plug to the valve stem.
Fig. 3 is a fragmentary detail view.

The flow diversion valve of the present invention is especially suited for use in a system for the pasteurization of milk or the like, in which system, the heated milk is delivered to the inlet port of the flow diversion valve. If this milk is at a prescribed pasteurizing temperature, suitable control mechanism actuates the valve plug of the flow diversion valve to direct the milk through the forward flow port of this valve to bottling mechanism or the like (not shown). However, if the milk delivered to the inlet port of the valve is below the required temperature, the mentioned control mechanism will move the valve plug so that this improperly pasteurized milk will be caused to pass through the diverted flow port of the valve for further treatment.

Referring especially to Fig. 1, the numeral 5 designates a separable valve body formed of two hollow T's 6 and 7. The T 6, at its lower end, is provided with an externally threaded bonnet connection 8 in which a valve stem (to be described) can be mounted. The side of T 6 is provided with an externally threaded diverted flow pipe connection 9 which serves as the diverted flow port of the valve body. A diverted flow pipe 10 having a beveled male seat 11 and a shoulder 12 is joined to the pipe connection at its female beveled seat 13 by means of a flanged nut 14 to afford a sanitary metal to metal seal between the mentioned seats 11 and 13.

The upper end of the T 6 is formed with a beveled female seat 15 and with an external threaded portion 16 by which the lower part of the T 7 can be detachably connected thereto. This connection comprises a beveled male seat 18 and an external shoulder 19 on T 7, by which a flanged nut 20, engaging this threaded portion 16 and the shoulder 19, draws the T's 6 and 7 together with the seats 15 and 18 in sealed relation. The side of the T 7 is made with an inlet connection 21 comprising an inlet port to be joined to an inlet pipe 22. This junction includes a beveled female seat 23 as well as an external threaded portion on the inlet connection 21, and a male beveled seat 24 with a related shoulder on pipe 22 whereby the seats 23 and 24 can be drawn together in sealed metal to metal relation by the flanged clamping nut 26.

The top of the T 7 comprises a forward flow pipe connection 25 to define a forward flow port. The connection 25 has a beveled female seat 27 and an adjacent external threaded portion 29 by which a forward flow pipe 30 with a shoulder 31 and a male beveled valve seat 32 can be drawn together by a flanged nut 33 with the beveled seats 27 and 32 in sealed engagement.

A valve plug 34 of simple construction, is movable within the valve body to cause the milk entering the valve through the inlet port, to flow either through the forward flow port or through the diverted flow port depending on the position of this plug with respect to the mentioned ports. The valve plug 34 comprises a cylindrical block of metal having a peripheral groove near each of its ends to receive the resilient O-rings or gaskets 35 and 36 respectively which make liquidtight seals with the inner surface of the T 7. The lower end of the plug as illustrated is provided with an axial lug 38 having a peripheral groove 39 and a peripheral groove 40 therein. The lug 38 is adapted to be received in the tubular valve stem 41. The stem 41 has opposed slots 42 therein, to register with the groove 39 whereby a key 43 can be inserted in the slots 42 to lock the plug on the valve stem. An O-ring 44 received in the groove 40, seals the joint between the lug 38 and the valve stem against the passage of milk.

The valve stem 41 is mounted to reciprocate in the axial opening through the cylindrical bonnet block 45. This block at its upper end is provided with an external shoulder 46 and a beveled peripheral male seat 47 adapted to engage the beveled female seat 48 on the lower end of the bonnet connection 8. An externally threaded flanged nut, engaging the shoulder 46 and the threaded portion 49 on the connection, draws the seats 47 and 48 in sealed metal to metal relation.

The lower end of the bonnet block is externally threaded at 51 on which the frame 52 of a diaphragm motor of well-known construction (not shown) can be screwed. The pushrod 53 of the valve motor (not shown) can be connected to the lower end of the valve stem 41 by a key 54 in the same manner that the upper end of the valve stem is locked to the lug 38. A bonnet nut 55 threaded on the external threads on the bonnet block, holds the flexible U-shaped gasket 56 in the end recess of the block to provide a liquidtight seal between the block and the valve stem.

If desired this flow diversion valve may be provided with a leak detection arrangement whereby any milk which undesirably leaks past the O-rings or gaskets 35 and 36 will leak outside of the valve body to indicate such a failure. When such indication is desired, the valve plug 34 is made with a peripheral groove 58 located between the grooves for the O-rings 35 and 36. The groove 58 communicates with a cross bore 59 through the plug, while bore 59 communicates through an axial bore 60 in the plug leading to the hollow valve stem 41. In this construction, the bonnet nut 55 is made with an integral extension 55A having a leak port 61 therein adapted to communicate with the leak port 62 in the valve stem, when the valve plug 34 is in its diverted flow position, as indicated in dotted lines. Thus any milk that leaks past the O-ring 36 will escape through the mentioned leak passages to the leak port 62. Consequently, improperly pasteurized milk cannot leak past the O-ring 35 into the forward flow port where it would pollute the milk flowing to the bottling machine. In this last mentioned construction the O-rings 63 and 64 seal the valve stem 41 to the bonnet nut extension while the O-ring 65 seals the hollow valve stem 41 to the pushrod 53. This sealing of the joints between the mentioned parts insures that the leakage milk will escape only through the leak port 62.

It will be understood that the flow diversion valve can be disconnected from the inlet pipe 22, from the forward flow pipe 30, and from the diverted flow pipe 10 by the removal of the flanged nuts 26, 33 and 14 respectively. The flow diversion valve, itself, can then be completely disassembled by removing the bonnet nut 55 whereby the valve plug 34 and its valve stem can be withdrawn from the valve body. The valve plug can be disengaged from the valve stem by the removal of key 43, while valve stem 41 can be disconnected from the pushrod 53 by the removal of key 54. Even the T's 6 and 7 of the valve body 5, can be separated by the removal of the flanged nut 20.

What I claim is:

1. In a flow diversion valve, a valve body comprising two hollow T's connected end to end by a sealed joint to provide a passage of uniform cross section extending therethrough, said joint including a conical male seat on one T and a conical female seat on the other T at the adjacent ends of said T's and means at said adjacent ends for drawing said seats into engagement, the upper end of the passage constituting a forward flow port, the lower T having a lateral pipe connection defining a diverted flow port communicating with said passage, the upper T being provided with a lateral pipe connection defining an inlet port also communicating with said passage, said valve body at said inlet port, at said forward port and at said diverted flow port being provided with conical female seats adapted to engage the conical male seats of pipes to be drawn into engagement with the respective female seats, a valve plug movable in sealing relation with the inner surface of said valve body from a position below said inlet port to a position above said inlet port and vice versa, a valve stem coupled to the lower part of said valve plug and movable through the lower part of said passage, and a detachable perforated block sealing the lower end of said passage, said valve stem being movable in liquidtight relation through the perforation in the block.

2. In a flow diversion valve, a valve body comprising two hollow T's sealed end to end to provide a main passage of uniform cross section extending completely therethrough, the upper end of the passage constituting a forward flow port, the lower T having a lateral pipe connection defining a diverted flow port communicating with said passage, the upper T being provided with a lateral pipe connection defining an inlet port also communicating with said passage, a valve plug movable in sealing relation with the inner surface of said valve body from a position below said inlet port to a position above said inlet port and vice versa, a valve stem coupled to the lower part of said valve plug and movable through the lower part of said passage, said plug being provided with spaced gaskets engaging said inner surface of said valve body, said plug also having an opening communicating with the space between said gaskets, said valve stem having a leak detecting valve passage therethrough communicating with said opening, and means sealing the lower end of said main passage and through which said valve stem is movable in liquidtight relation.

3. In a flow diversion valve, a valve body comprising two separate hollow T's fastened together end to end in sealed relation to provide a straight elongated passage extending therethrough and to provide two lateral port connections communicating with said passage at spaced points along the same, one end of said passage serving as an end port, means including a valve plug movable in said passage from a sealing position therein between said end port and the adjacent lateral port connections, to a second sealing position between said lateral port connections and vice versa, a valve stem connected to said valve plug for moving the same, said plug being provided with spaced gaskets engaging the inner surface of said valve body, said plug also having an opening communicating with the space between said gaskets, said valve stem having a leak detecting passage therethrough communicating with said opening.

AUGUSTUS W. GRISWOLD.

REFERENCES CITED

The following references are of record in the file of this patent:

UNITED STATES PATENTS

| Number | Name | Date |
|---|---|---|
| 208,344 | Stephens | Sept. 24, 1878 |
| 658,721 | Kelly | Sept. 25, 1900 |
| 901,728 | Newton | Oct. 20, 1908 |
| 1,099,418 | Aughenbaugh | Jan. 9, 1914 |
| 1,208,598 | Mackey | Dec. 12, 1916 |
| 1,288,578 | Hatfield | Dec. 24, 1918 |
| 1,765,272 | Houghland | June 17, 1930 |
| 1,868,947 | Manning | July 26, 1932 |
| 1,936,236 | Hill | Nov. 21, 1933 |
| 1,945,724 | Beebe | Feb. 6, 1934 |
| 1,998,830 | Beebe | Apr. 23, 1935 |
| 2,289,632 | Dalzell | July 14, 1942 |
| 2,360,733 | Smith | Oct. 17, 1944 |